US008229344B1

(12) United States Patent
Petersen et al.

(10) Patent No.: US 8,229,344 B1
(45) Date of Patent: Jul. 24, 2012

(54) RF COMMUNICATION RECEIVER VULNERABILITY ASSESSMENT

(75) Inventors: Joshua Petersen, Amherst, NH (US); William Delaney, Bedford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 285 days.

(21) Appl. No.: 12/548,171

(22) Filed: Aug. 26, 2009

(51) Int. Cl.
*H04K 3/00* (2006.01)
*H04B 17/00* (2006.01)

(52) U.S. Cl. .......... 455/1; 455/67.11; 455/423; 455/425

(58) Field of Classification Search ........... 455/1, 67.11, 455/423–425
See application file for complete search history.

(56) References Cited

U.S. PATENT DOCUMENTS

| | | | |
|---|---|---|---|
| 7,130,624 B1* | 10/2006 | Jackson et al. | 455/420 |
| 7,302,234 B1* | 11/2007 | Fessler et al. | 455/67.13 |
| 7,437,128 B1* | 10/2008 | Fessler et al. | 455/67.13 |
| 7,532,856 B2* | 5/2009 | Stoddard et al. | 455/1 |
| 7,552,670 B2* | 6/2009 | Goldman et al. | 89/1.13 |
| 7,746,265 B2* | 6/2010 | Brumley et al. | 342/13 |
| 7,756,516 B2* | 7/2010 | Steffen et al. | 455/425 |
| 7,949,334 B2* | 5/2011 | Lorenzen | 455/425 |
| 8,010,038 B2* | 8/2011 | Valentine et al. | 455/1 |
| 8,099,893 B2* | 1/2012 | Jung et al. | 42/14 |
| 8,140,001 B2* | 3/2012 | Haverty | 455/1 |
| 2003/0054755 A1* | 3/2003 | Zehavi et al. | 455/1 |
| 2004/0106400 A1* | 6/2004 | Woo et al. | 455/423 |
| 2004/0242149 A1* | 12/2004 | Luneau | 455/1 |
| 2005/0064922 A1* | 3/2005 | Owens et al. | 455/575.5 |
| 2006/0164282 A1* | 7/2006 | Duff et al. | 342/14 |
| 2007/0010240 A1* | 1/2007 | Gabler et al. | 455/423 |
| 2008/0274699 A1* | 11/2008 | Montes | 455/67.11 |
| 2009/0104869 A1* | 4/2009 | Li | 455/1 |
| 2010/0304706 A1* | 12/2010 | Haverty | 455/404.1 |

OTHER PUBLICATIONS

"Instrument Control Toolbox 2 Control and communicate with test and measurement instruments", The MathWorks, May 2004.
"Electromagnetic Environmental Effects Requirements for Systems", Department of Defense Interface Standard, MIL-STD-464, Mar. 18, 1997.
"Willtek RF Shield Box RF shielding in cell phone testing", Willtek Communications, Dec. 2004.
"Willtek 4920 RF Shield Box Shielding from electromagnetic interference delivers reliable results", Willteck Communications, Dec. 2004.

* cited by examiner

*Primary Examiner* — Lester Kincaid
*Assistant Examiner* — Steven Kelley
(74) *Attorney, Agent, or Firm* — Finch & Maloney PLLC; Neil F. Maloney

(57) ABSTRACT

Techniques are disclosed for analyzing a wireless communications device. The techniques include, for instance, assessing vulnerability of the device, including its susceptibility to jamming, by applying one or more interfering signals to the device and observing the device's response. The techniques further include identifying one or more vulnerabilities that can be exploited in defeating malicious behavior involving use of the device (e.g., such as using the device for remote detonation of explosives). Applying one or more interfering signals to the device may include, for instance, applying a trigger signal and a jamming signal to the device, and adjusting the jamming signal until the trigger signal is rendered ineffective in acting as a trigger signal. Identifying one or more vulnerabilities that can be exploited in defeating malicious behavior may include, for instance, reporting parameters of the one or more interfering signals that result in defeating the malicious behavior.

20 Claims, 10 Drawing Sheets

RF COMMUNICATION RECEIVER VULNERABILITY ASSESSMENT

STATEMENT OF GOVERNMENT INTEREST

The invention was made with United States Government support under contract N00024-06-C-6353 awarded by the Army, and the United States Government has certain rights in this invention.

FIELD OF THE INVENTION

The invention relates to wireless communications, and more particularly, to techniques for characterizing and identifying vulnerabilities associated with wireless communications devices.

BACKGROUND OF THE INVENTION

A typical wireless communications device generally includes a transceiver that allows the device to both receive and transmit wireless signals. Example such devices include, for instance, cell phones, handheld and mobile two-way radios such as walkie-talkie radios and family radio service (FRS) radios, high-power cordless telephones (sometimes call long range cordless telephones, or LRCTs), and any device having a general purpose communications transceiver. Some such devices may only have a receiver component (e.g., radio).

While such communications devices generally serve numerous useful and beneficial purposes, they can also be used for harmful purposes, such as in the context of explosives (e.g., cell phone based trigger that allows for remote detonation), or other malicious activity that is atypical of normal device use.

There is a need, therefore, for techniques for characterizing and identifying vulnerabilities associated with wireless communications devices.

SUMMARY OF THE INVENTION

One embodiment of the present invention provides a method for analyzing a wireless communications device. The method includes assessing vulnerability of the wireless communications device, including its susceptibility to jamming, by applying one or more interfering signals to the wireless communications device and observing a response from the wireless communications device. The method further includes identifying one or more vulnerabilities that can be exploited in defeating malicious behavior involving use of the wireless communications device. The malicious behavior may involve, for example, using the wireless communications device for remote detonation of explosives. In one example case, the one or more vulnerabilities of the wireless communications device include at least one of radio access vulnerabilities, FM demodulator vulnerabilities, signaling layer processing vulnerabilities, DTMF decoder vulnerabilities, telemetry decoder vulnerabilities, message recovery vulnerabilities, and protocol processing vulnerabilities. In another particular case, applying one or more interfering signals to the wireless communications device includes applying a trigger signal and a jamming signal to the wireless communications device, and adjusting the jamming signal until the trigger signal is rendered ineffective in acting as a trigger signal. In another particular case, the method further includes characterizing the wireless communications device to identify one or more performance attributes of the wireless communications device that can be used in assessing vulnerability. In one such case, characterizing the wireless communications device to identify one or more performance attributes of the device includes at least one of: measuring at least one of transmit power, receiver sensitivity, and antenna performance of the wireless communications device; measuring at least one of filter performance, amplifier gain, mixer performance, channelization, and frequency/time division performance of the wireless communications device; and measuring baseband processing and decoder performance and response time of the wireless communications device. In another such case, characterizing the wireless communications device to identify one or more performance attributes of the device comprises at least one of: analyzing modulation and/or demodulation parameters of the wireless communications device; and analyzing protocol parameters of the wireless communications device. In another such case, characterizing the wireless communications device to identify one or more performance attributes of the device comprises at least one of: conducting passive unintentional radiation exploitation (URE) sweeps and active URE sweeps in passband of the wireless communications device; conducting two-tone sweeps and direct transmission on intermediate frequencies of the wireless communications device, and on frequencies that generate the intermediate frequency as a harmonic; and identifying unique signature characteristics of the wireless communications device. In another particular case, the method further includes target deployment and operation assessment to define how of the target communications device can be deployed and triggered in the context of the malicious behavior. In another particular case, identifying one or more vulnerabilities that can be exploited in defeating malicious behavior involving use of the wireless communications device includes reporting parameters of the one or more interfering signals that result in defeating the malicious behavior.

Another embodiment of the present invention provides a computer-readable memory having instructions encoded thereon that when executed by a processor, cause a process for analyzing a wireless communications device to be carried out on a test system. The process may be implemented, for example, as described with respect to the previously described method, although any number of variations will be apparent in light of this disclosure.

Another embodiment of the present invention provides a system for analyzing a wireless communications device. The system includes a vulnerability assessment module for assessing vulnerability of the wireless communications device, including its susceptibility to jamming, by applying one or more interfering signals to the wireless communications device and observing a response from the wireless communications device. The system further includes a reporting module for identifying one or more vulnerabilities that can be exploited in defeating malicious behavior involving use of the wireless communications device (e.g., using the wireless communications device for remote detonation of explosives). In applying one or more interfering signals to the wireless communications device, the vulnerability assessment module may be configured, for example, to apply a trigger signal and a jamming signal to the wireless communications device, and to adjust the jamming signal until the trigger signal is rendered ineffective in acting as a trigger signal. The reporting module for identifying one or more vulnerabilities may be configured, for example, to report parameters of the one or more interfering signals that result in defeating the malicious behavior.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIGS. 9*a* and 9*b* illustrate different response waveforms on the same target device for an example Swept Trigger test, wherein FIG. 9*a* shows the waveform from Day 1 and FIG. 9*b* shows the waveform on Day 2, in accordance with one embodiment of the present invention.

DETAILED DESCRIPTION OF THE INVENTION

Techniques are disclosed for characterizing and identifying vulnerabilities associated with wireless communications devices. The vulnerabilities can then be exploited to diffuse or otherwise mitigate situations that employ such wireless communications devices in carrying out malicious activity.

Analyzing wireless communication devices to identify vulnerabilities is not a trivial task, as there is generally no convention or standard for guiding the process. Such analysis involves time consuming processes where a person has to manually define a number of characterizing tests, setup each test, perform the tests, collect the relevant test data, and interpret the data. A test report can also be generated. In addition to being time consuming, the tests may be prone to repeatability problems and/or error. Also, there tends to be a lack of consistency in analysis from one communication device or system to another. Also, given the manual nature and length of testing to be done, it is generally difficult to analyze a large number of systems.

One embodiment of the present invention is a system referred to herein as an automated vulnerability assessment tool. The tool is configured for automatic testing and data collection required when performing vulnerability assessment of target wireless communication devices and systems. In one particular case, the system executes or otherwise carries out a series of automated receiver/transmitter test procedures and measurements to characterize RF communication system vulnerability to RF interference. The tool allows a target wireless communication system to be analyzed quickly and in a repeatable manner, with the data stored and presented in an easily discernible report. The tool allows for many communication systems to be analyzed so that trends/variations can be detected within a receiver family. Thus, in one such embodiment, the tool is able to automatically create a core report demonstrating one to ten vulnerabilities, and compare results across a large number of RF communication systems. A user interface can also be provided, such that the tool can generate test results in a relatively short time with minimal operator interaction.

Methodology

Figure 1:
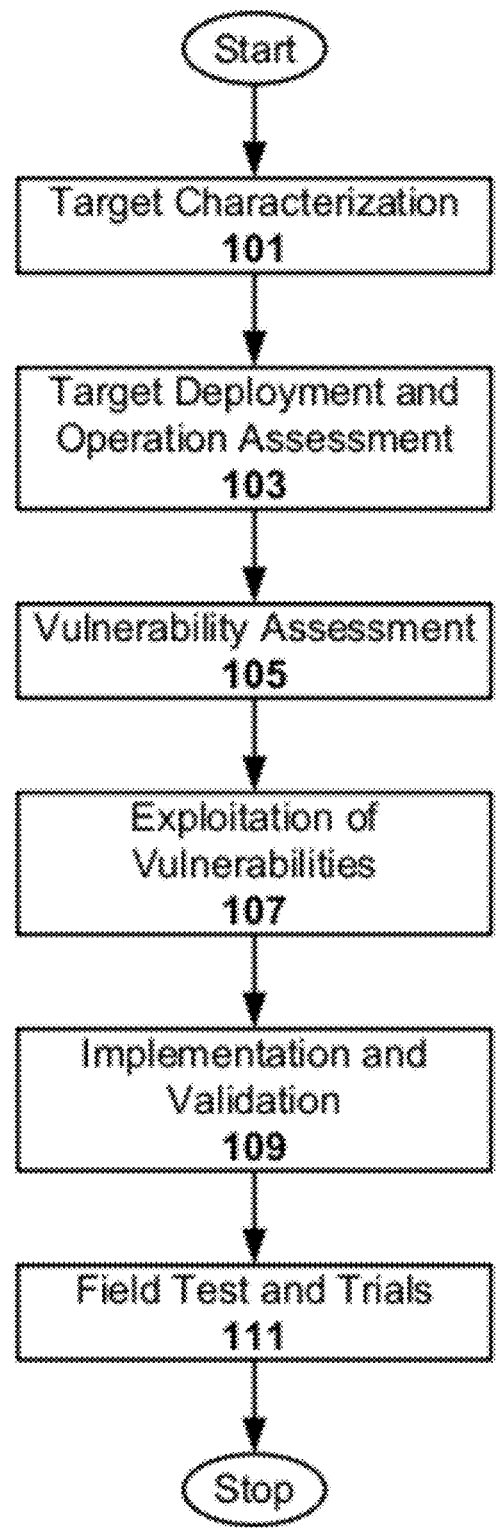
FIG. 1 illustrates a method for analyzing wireless communications devices, in accordance with one embodiment of the present invention.

FIG. 1 illustrates a method for analyzing wireless communications devices, in accordance with one embodiment of the present invention. As can be seen, the method includes a number of steps ranging from 101 to 111. The step numbers are not necessarily intended to implicate or otherwise require a particular order; rather the step numbers are provided to facilitate easy reference, and can be carried out in any sequence, as will be apparent in light of this disclosure. For instance, steps that do not use input from other steps may be carried out at any time during the method. Similarly, a step that uses input from one or more preliminary steps can be carried out any time after relevant data produced from those preliminary steps becomes available. Further note that not all steps depicted are required, and alternates and variations will be apparent in light of this disclosure. For instance, in one particular case, the method may focus on assessing vulnerabilities associated with a wireless communications device, so that those vulnerabilities can be exploited in defeating malicious behavior.

As can be seen, the method of this example embodiment begins with target characterization at 101. This characterization of the target wireless communications device can be accomplished in a number of ways, including automated and/or manual portions, so as to identify one or more performance attributes of the target device. For instance, and in accordance with one such example embodiment, automated characterization is used to determine the link budget (anechoic/open air), which may include measuring transmit power (e.g., effective isotropic radiated power—EIRP), receiver sensitivity (e.g., to triggering waveform), and/or antenna performance (e.g., Rx and Tx gain and directionality). In addition, or alternatively, the automated characterization may analyze the RF front-end of the target device, which may include measuring, for example, filter performance (sweeps), amplifier gain, mixer performance, channelization, and/or frequency/time division performance. In addition, or alternatively, the automated characterization may include modulation analysis. For example, this analysis may include analyzing the target device's modulation parameters (e.g., type of modulation, rate, phase shift, FM deviation, and/or other modulation parameters) both for the existing transmitter and optimum parameters for receiver. In a similar fashion, the demodulator performance may be characterized as well (e.g., using complementary analysis relative to the modulation analysis). In addition, or alternatively, the automated characterization may include measuring baseband processing and decoder performance (complementary to encoder performance tests) and response time, and generating timelines and sequence diagrams therefrom. In some cases, note that the decoder may have multiple stages (e.g., some decoding may be done by the device's modem for synchronization, and other decoding portions may be done by a processor interface control or other parallel process). In addition, or alternatively, the automated characterization may include protocol analysis. Such analysis may include, for instance, identifying or otherwise analyzing protocol parameters such as sequence diagrams/timelines, synchronization method, framing and blocking, error detection and correction codes, field size/definition/content, encryption/scrambling techniques, and/or other protocol features/parameters. In addition, or alternatively, the automated characterization may include unintended radiation analysis, which may include, for example, conducting passive unintentional radiation exploitation (URE) sweeps (e.g., such as test method RE102 of MIL-STD-462, which specifies allowable electric field emissions from subsystems) and active URE sweeps (single tone and two tone) in passband. In addition, or alternatively, the automated characterization may include unintended insertion/injection testing, which may include, for instance, conducting two-tone sweeps and direct transmission on intermediate frequencies and frequencies which would generate the intermediate frequency as a harmonic. In addition, or alternatively, the automated characterization may include identifying unique signature characteristics by, for example, recording transmission transients and measuring clock-controlled or analog-filter-effected parametrics (e.g., how much does the baudrate vary from expected, deviation, overshoot from filter, center frequency, and other such metrics). Any number of device parameters that can be automatically measured (using test equipment such as spectrum analyzers and oscilloscopes) and/or derived can be used to characterize the target device. Optional manual characterization may include, for example, taking pictures of the target device outside and/or inside, collecting any operator/maintenance documents pertaining to the target device, collecting chipset descriptions/data sheets pertaining to the target device, generating schematics and block diagrams of the target device (e.g., in SPICE or ADS modeling software). Other optional manual tests may include durability testing (e.g., crush strength, impact resistance) and/or environmental resistance (e.g., resistance to water or chemicals). Such information learned from manual characterization can be used directly or indirectly in automatic characterization analysis. For instance, schematics directly inform probing points accessed during automatic characterization, and durability test results indirectly inform the type of mitigation techniques to be used in diffusing a particular device deployed for malicious purposes.

Figure 2:
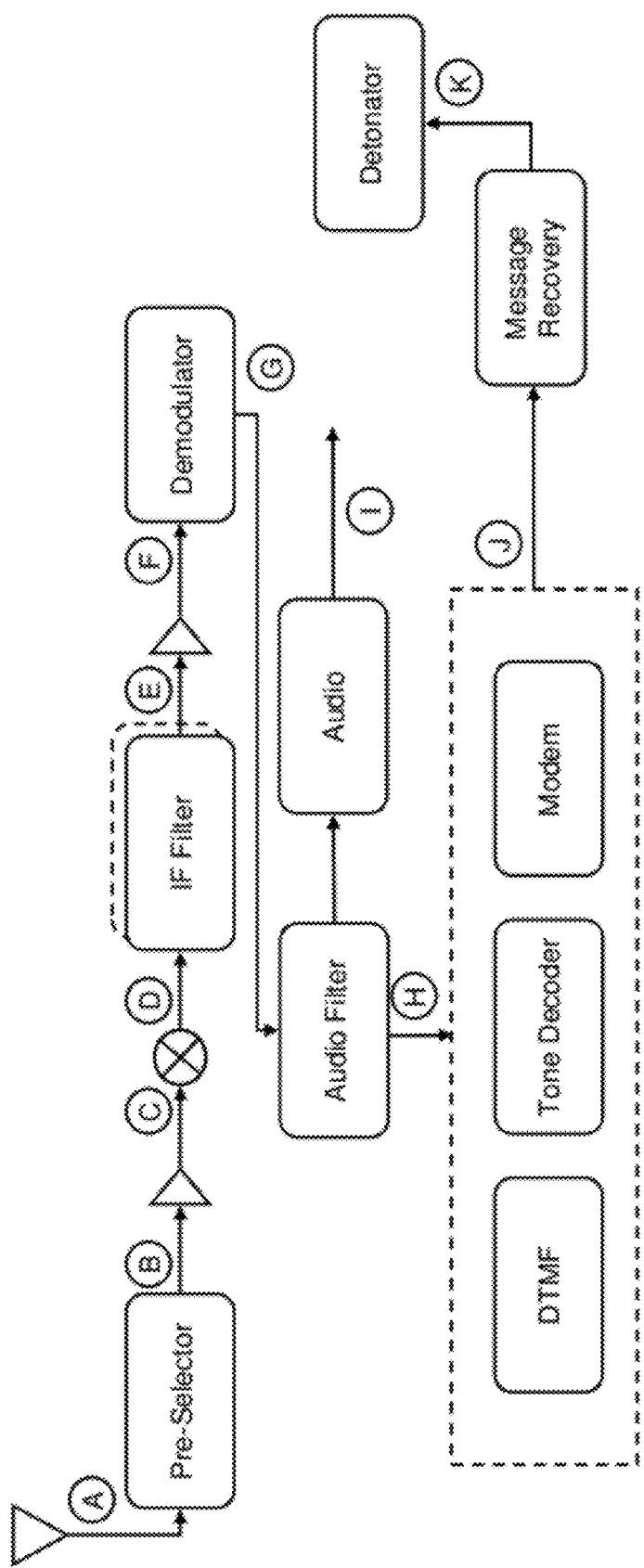
FIG. 2 demonstrates a number of example measurement points that can be utilized in analyzing wireless communications devices, in accordance with one embodiment of the present invention.

FIG. 2 demonstrates a number of example measurement points that can be utilized in analyzing wireless communications devices, in accordance with one embodiment of the present invention. As will be appreciated, the points shown are generally associated with the FM demodulator chip/circuit of the target device. As can be seen, this example case involves analyzing the use of the wireless communications device as a trigger for remote detonation of an explosive device; other test case scenarios and applications will be apparent in light of this disclosure. As can be further seen, point A can be used to measure parameters associated with the antenna input; point B can be used to measure parameters associated with the pre-selector output; point C can be used to measure parameters associated with the output of the first gain block and/or first mixer input or output; point D can be used to measure parameters associated with the input to the intermediate frequency (IF) filter; point E can be used to measure parameters associated with the input of the automatic gain control (AGC) block; point F can be used to measure parameters associated with the input to the demodulator; point G can be used to measure parameters associated with the output of the demodulator; point H can be used to measure parameters associated with the input to the audio block as well as the dual-tone multi-frequency (DTMF)/tone decoder/modem block; point I can be used to measure parameters associated with the audio output; point J can be used to measure parameters associated with the output to message recovery; point K can be used to measure parameters associated with the input to the detonator. In one specific embodiment, the following parameters/functionality are automatically evaluated or otherwise characterized on target devices for step 101 of FIG. 1: pre-selector sweep, RF/IF linearity, signal-to-noise-and-distortion (SINAD), intermodulation rejection, AM noise interference rejection, blocking rejection, adjacent channel rejection, offset channel selectivity, and audio response. Other such parameters and functionality can be characterized as well, and the present invention is not intended to be limited to a particular set or subset of parameters and functionality.

With further reference to FIG. 1, the method continues with target deployment and operation assessment at step 103. The purpose of this optional step is to define how the target system can be deployed and triggered, or otherwise used to carryout malicious activity. In one embodiment, this step includes, for instance, identifying the modifications that are typically made to the device that enable it to be used for malicious activity (such as the coupling of the target device to a detonator). Note that this step can be informed by information collected by field personnel who have observed how target systems are used to carryout malicious activity. An information or so-called wiki system (e.g., such as that provided by MediaWiki™ software) or an online database can be used to allow for compiling, sharing and development of such information.

Figure 3:
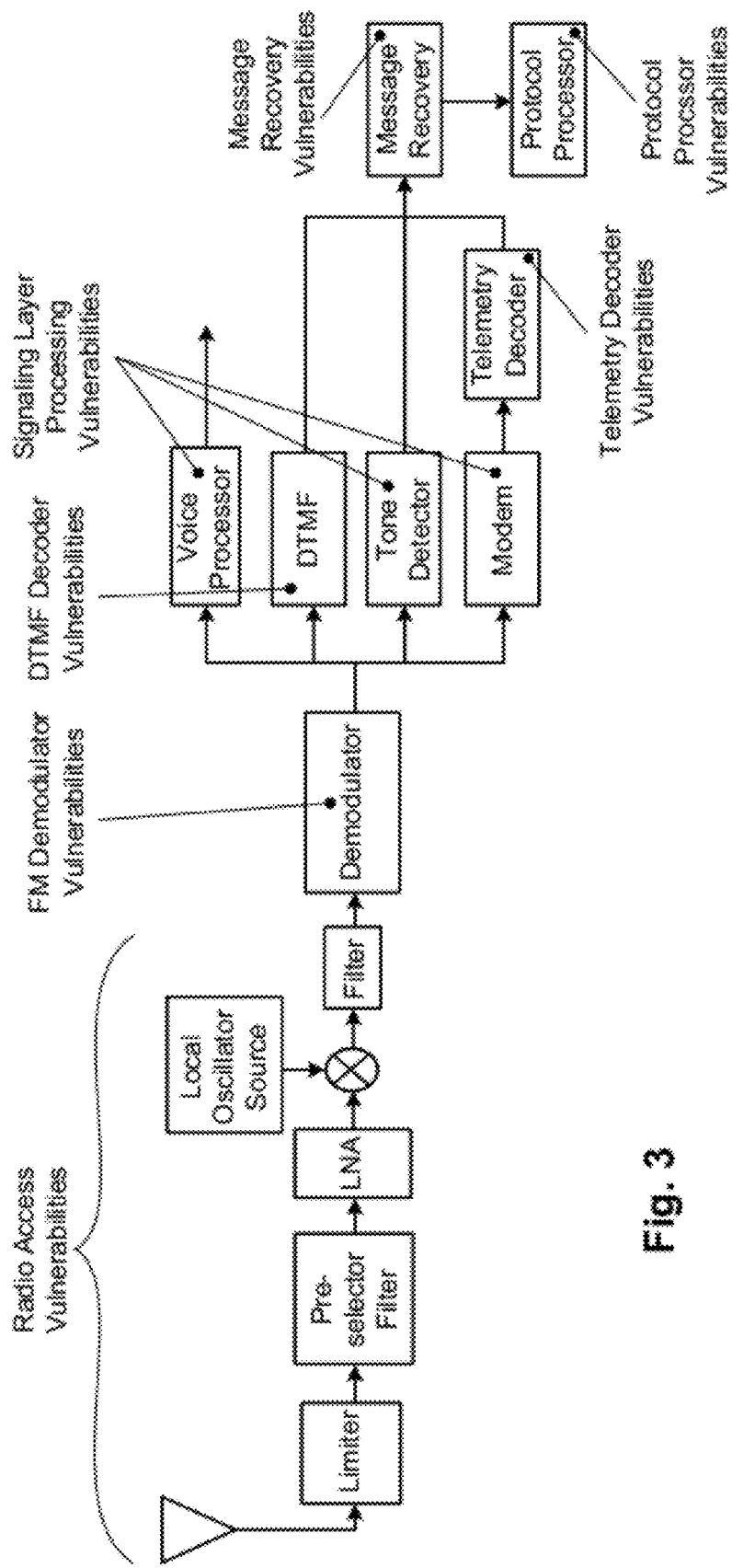
FIG. 3 demonstrates an example wireless communications device architecture showing locations where vulnerabilities exist, so as to allow for exploitation as described herein.

The method continues at step 105 with vulnerability assessment to identify one or more specific vulnerabilities of the target device, which can also be automated as with target characterization. Example vulnerabilities that can be assessed include radio access vulnerabilities (e.g., such as vulnerabilities associated with the antenna and front-end of receiver, including limiter, pre-selector filter, low noise amplifier—LNA, local oscillator, mixer, and filter), FM demodulator vulnerabilities, signaling layer processing vulnerabilities (e.g., such as vulnerabilities associated with squelch, privacy line codes, digital privacy line, and tones), DTMF decoder vulnerabilities, telemetry decoder vulnerabilities, message recovery vulnerabilities, and/or protocol processing vulnerabilities. FIG. 3 demonstrates an example receiver architecture, which is typically employed by wireless communications devices, showing corresponding locations where such vulnerabilities exist. As will be explained in turn, the vulnerability assessment can be performed, for example, by injecting or otherwise applying interfering signals and observing the target's responses. By generating and validating simulated trigger waveforms, the various vulnerabilities of the target device can be identified, assessed, and subsequently exploited.

Radio access vulnerabilities can be assessed, for example, through the unintended insertion/injection testing (e.g., using two-tone sweeps and direct transmission on the IF and frequencies which would generate the IF as a harmonic). One example vulnerability is susceptibility to jamming, where both a desired trigger signal and a jamming signal are provided to the target device. The jamming signal can be configured or otherwise adjusted until a favorable result is achieved (e.g., trigger signal is rendered ineffective in triggering a detonator). Demodulator vulnerabilities are those associated, for instance, with frequency modulation (FM), FM minimum-shift keying (MSK), and the modem. Again, interfering signals can be injected, while observing the target device's modem/modulation scheme response to that interference. Once a desirable, repeatable response caused by a known interfering stimulus is identified, that interfering stimulus can be used in exploiting the vulnerability. Decoder vulnerabilities are those associated, for instance, with privacy line codes, DTMF, tone decoder, message processing vulnerabilities, and hang-ups. In accordance with an example embodiment, the automated vulnerability assessment at step 105 includes one or more of the following tests: sensitivity test, power sweeps, FM bandwidth sweeps, tone demodulator tests, IF insertion sweeps, multi-signal injection tests, drift tests, CW denial, matched denial, chirp denial or swept-chirp denial, and/or test trigger. Each of these tests will be discussed in further detail with reference to the test system of FIGS. 4 and 5a-b.

With further reference to FIG. 1, the method may continue with exploitation of vulnerabilities at step 107, which involves developing techniques that exploit target device vulnerabilities (identified at step 105) to create a desired effect. In some embodiments, this optional exploitation is performed by injecting interfering signals, with knowledge of and focus on a particular vulnerability or set of vulnerabilities, and observing the target device response. Once a desired effect or result is achieved with a known exploitive process, then the method of FIG. 1 may further continue with implementation and validation at step 109. The purpose of this optional step is to implement techniques that have demonstrated favorable results during exploitation at 107, so as to provide robust and repeatable results from one target device to the next. In one such embodiment, the proven techniques are programmed or otherwise configured into an operational system that executes one or more load sets. A load set generally refers to a combination of techniques designed to defeat one or more threats associated with various target devices. Any suitable programming language can be used (e.g., Basic, C, C++, object oriented C, etc) to code the automatic characterization, vulnerability assessment tests/functionality, and/or exploitation. As will be discussed with reference to FIG. 4, commercial test equipment can be used in conjunction with the code to implement a vulnerability assessment system configured in accordance with an embodiment of the present invention.

The method may further include optional field testing and trials at step 111, where controlled field tests are carried out to further validate effectiveness of identified vulnerabilities and exploitation techniques. This optional validation may further include conducting independent trials for testing the effectiveness of the vulnerability assessment techniques.

Test System

Figure 4:
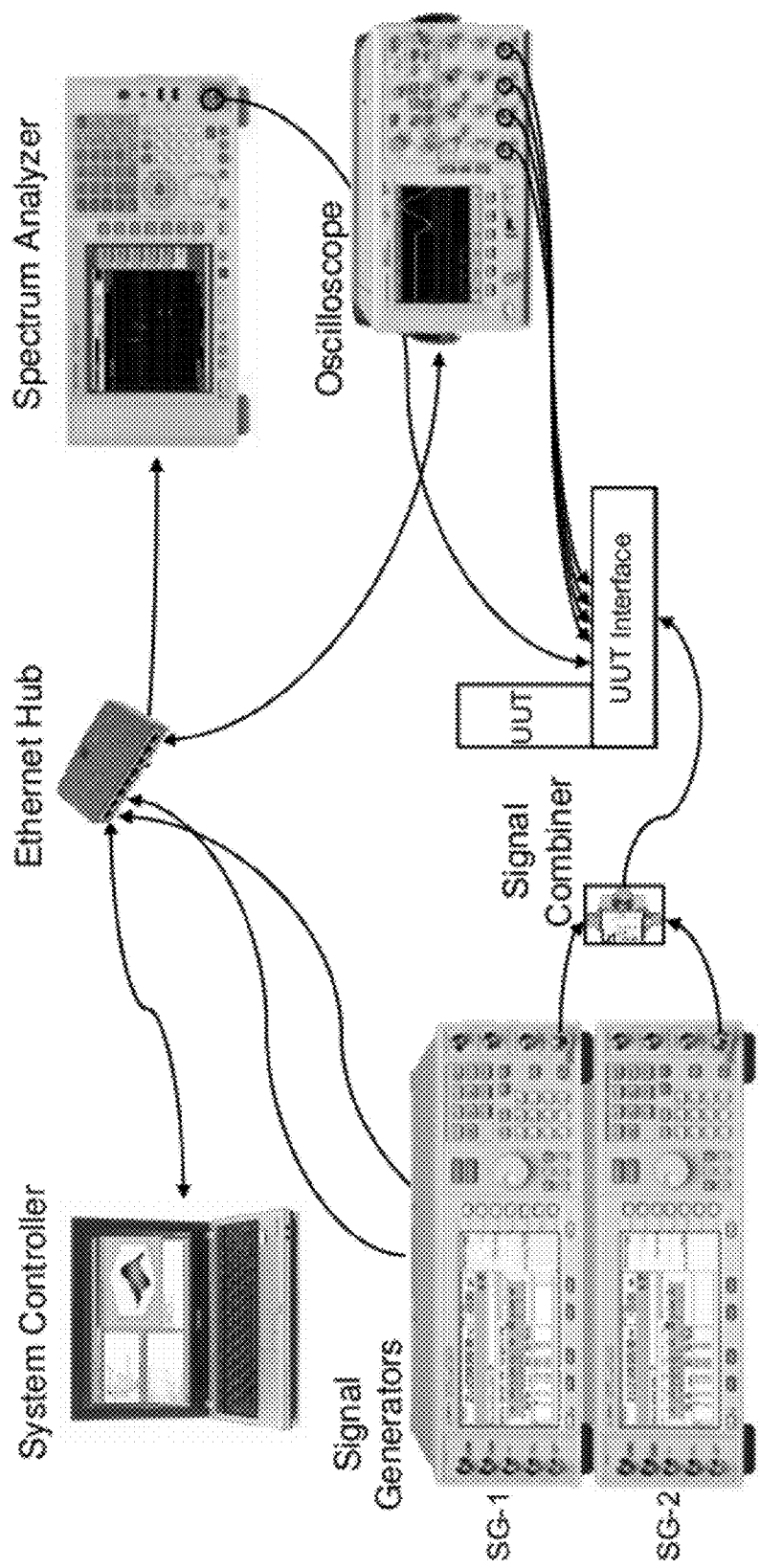
FIG. 4 illustrates a test system for automatically assessing vulnerabilities associated with wireless communications devices, in accordance with one embodiment of the present invention.

FIG. 4 illustrates a test system for automatically characterizing and identifying vulnerabilities associated with wireless communications devices, in accordance with one embodiment of the present invention.

As can be seen, the system of this example embodiment includes a system controller, two signal generators (SG-1 and SG-2), a spectrum analyzer, an oscilloscope, and a unit under test (UUT) interface. A target device (or UUT) is operatively coupled to the system via the UUT interface, which may include an antenna interface and/or a probe-based interface. An Ethernet hub is used to operatively couple the test equipment (signal generators SG-1 and SG-2, spectrum analyzer, and oscilloscope) to the system controller, and a signal combiner allows for combining of signals from the signal generators (e.g., for two tone input signals). Conventional probes (e.g., high impedance o-scope probes and spectrum analyzer probes) can be used to access points of the UUT during testing. To this end, note that the housing of the UUT (or a portion of the housing) can be opened or otherwise removed to provide probe access to the UUT circuitry. Ethernet cables can be used to implement the connections to/from the Ethernet hub. RF cabling can be used to implement the connections from the signal generators to the combiner and UUT interface. The system is configured to execute a series of tests applicable to one or more types of target devices/UUTs. In this example embodiment, the testing is directed or otherwise carried out by a set of instructions (e.g., software and/or firmware) executable by the system controller, which in turn operates the signal generators to deliver desired stimulus to the UUT and the spectrum analyzer and oscilloscope to measure various input and/or output parameters of the UUT.

Figure 5A:
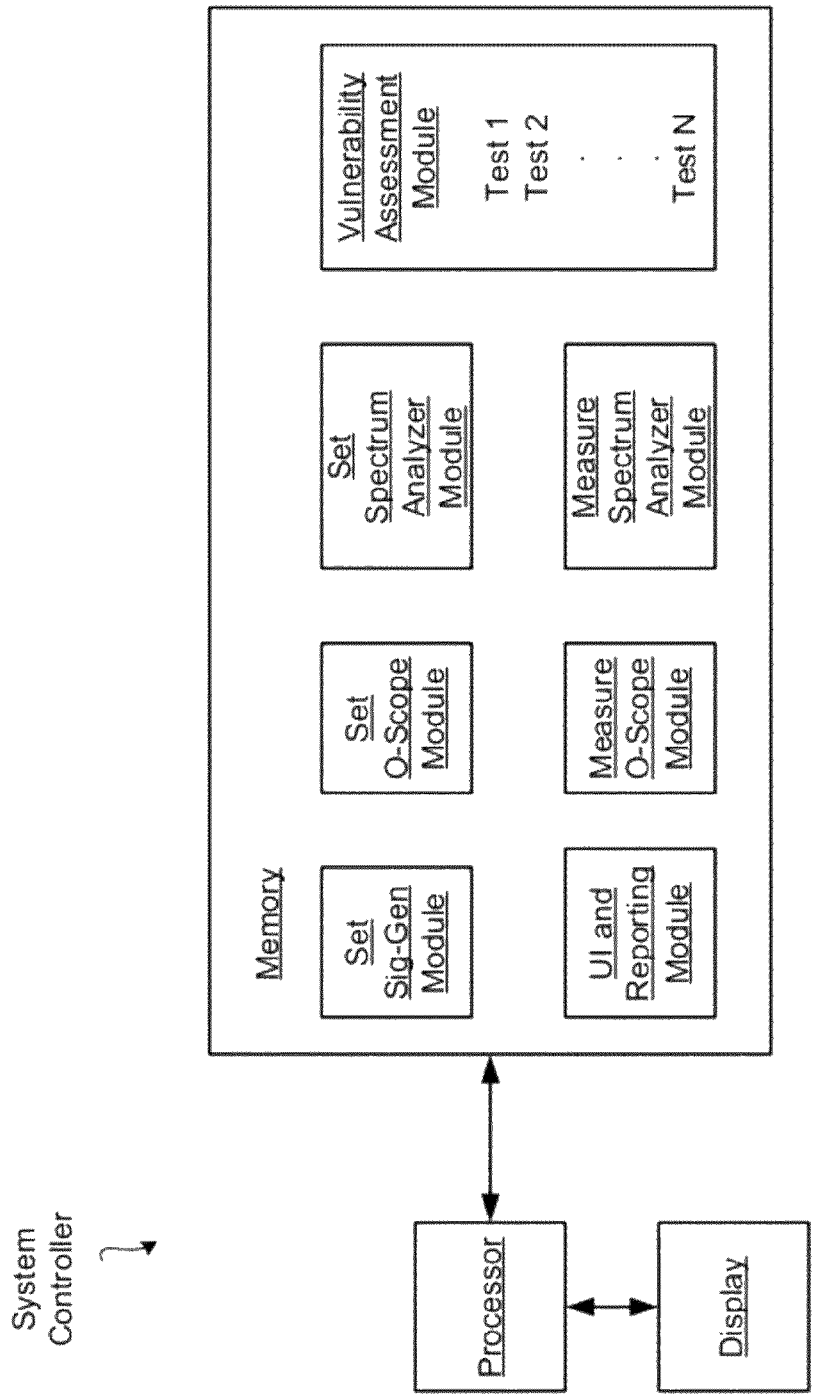
FIG. 5*a* is a block diagram of a system controller that can be used with the test system shown in FIG. 4, configured in accordance with one embodiment of the present invention.

FIG. 5a is a block diagram of a system controller that can be used with the test system shown in FIG. 4, configured in accordance with one embodiment of the present invention. As can be seen, the system controller of this example embodiment includes a processor operatively coupled to a memory and a display, as commonly done for example with conventional computers (e.g., laptops, desktops, etc). The memory includes a number of modules that can be executed by the processor, so as to carryout specific functions as will now be described.

In particular, the Set Sig-Gen Module is programmed or otherwise configured to set-up the signal generators SG-1 and SG-2 according to a particular set of test parameters. This may involve, for example, setting the type of signal (CW, chirp, etc) as well as signal parameters (e.g., frequency, amplitude, etc). The Set O-Scope Module is programmed or otherwise configured to set-up the oscilloscope according to a particular set of test parameters. This may involve, for example, setting oscilloscope parameters such as input trigger level, center frequency, input signal range, averaging, continuous run or single shot acquisition mode, etc. The Set Spectrum Analyzer Module is programmed or otherwise configured to set-up the spectrum analyzer according to a particular set of test parameters. This may involve, for example, setting analyzer parameters such as input center frequency, input signal range and input attenuation, averaging, sweep time, span, etc. The Measure O-Scope Module is programmed or otherwise configured to command the oscilloscope to make one or more measurements according to a particular set of test parameters (e.g., 1 dB compression point, 3 dB bandwidth, amplitude at a given frequency, etc). The Measure Spectrum Analyzer Module is programmed or otherwise configured to command the spectrum analyzer to make one or more measurements according to a particular set of test parameters (e.g., 1 dB compression point, 3 dB bandwidth, amplitude at a given frequency, etc). The vulnerability assessment module is programmed or otherwise configured to execute a number of vulnerability assessment tests (Test 1, Test 2, . . . Test N). For instance, the vulnerability assessment module may carryout one or more of the following tests: sensitivity test, power sweeps, FM bandwidth sweeps, tone demodulator tests, IF insertion sweeps, multi-signal injection tests, drift tests, CW denial and/or matched denial tests, chirp denial and/or swept-chirp denial tests, and/or trigger tests, each of which will be described in more detail below.

Figure 5C:
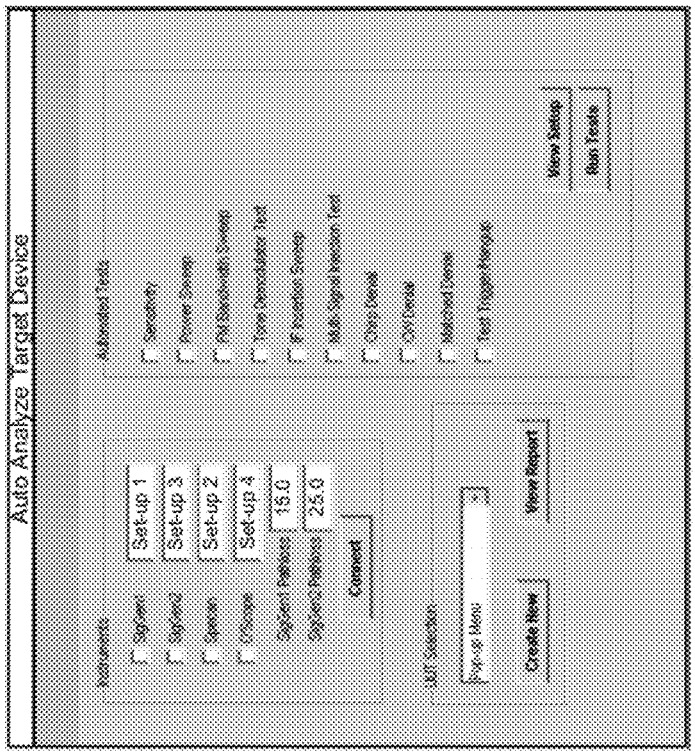
FIGS. 5*b*-5*c* each illustrate example graphical user interfaces that can be configured into the UI/reporting module of FIG. 5*a*, in accordance with one embodiment of the present invention.
Figure 5B:
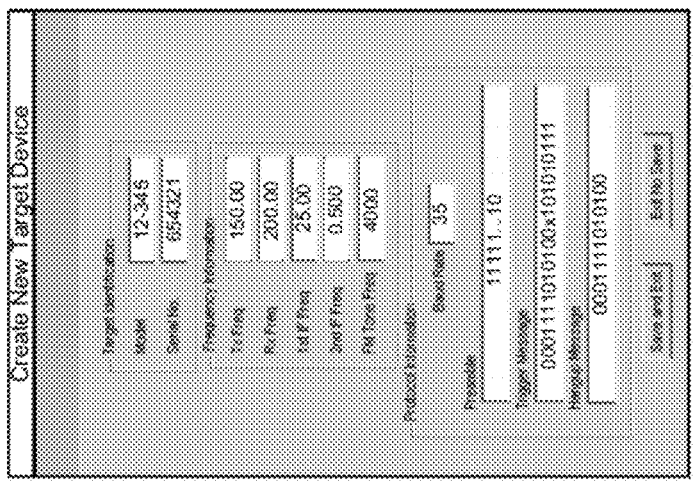

The UI and Reporting Module is programmed or otherwise configured to provide the user with graphical user interfaces that allow for interaction with the system, and for generating reports that indicate results of testing carried out. For instance, FIG. 5b illustrates an example graphical user interface (GUI) that can be configured into the UI and Reporting Module, which allows the user to create and save a profile for a target device for testing. Specific information unique to that particular device type can be entered, such as target device identification (e.g., model, serial number), frequency information (e.g., transmit frequency, receive frequency, first IF frequency, second IF frequency, FM tone frequency), and protocol information (e.g., baud rate, message preamble, trigger message, and hang-up message). FIG. 5c illustrates an example GUI that can be configured into the UI and Reporting Module, which allows the user to specify specific instruments being used in the system (e.g., signal generators 1 and 2, oscilloscope, spectrum analyzer) as well as a particular set-up or profile and any calibration factors (e.g., path loss, etc) associated with those instruments, for use in auto-analyzing the target device. The example GUI of FIG. 5c further allows the user to select one or more vulnerability assessment tests that can be executed on a target device. In this particular example, the following vulnerability assessment tests are available for selection by the user: sensitivity test, power sweep, FM bandwidth sweep, tone demodulator test, IF insertion sweep, multi-signal injection test, chirp denial, CW denial, matched denial, and/or test trigger/hangup, each of which will be explained in turn.

In one specific embodiment, the system controller is implemented using MATLAB® and the Instrument Control Toolbox™, which allows for communication with and commanding of the signal generators, oscilloscope, and spectrum analyzer, directly from MATLAB®. For instance, the Instrument Control Toolbox™ can be used to generate data in MATLAB® to send out to an instrument, and read data into MATLAB® for analysis and visualization. As will be appreciated in light of this disclosure, the actual functionality and tests programmed or otherwise configured into and run by the system controller may vary depending on the type of target device. For instance, a test set that is appropriate for cell phones may not be appropriate for long range cordless telephones, and vice versa. Likewise, the UUT interface for operatively coupling the target device (UUT) to the system may vary depending on the type of UUT. For example, a cell phone can typically be coupled to the test system via active probing and/or an antenna coupler included in the UUT interface. In one example embodiment, the UUT interface includes an RF shield box (e.g., such as the Willtek 4920 RF Shield Box). In such cases, the operator can place the UUT in the RF shield box and attach the UUT to the universal antenna coupler of the RF shield box. In addition to this antenna interface, the UUT interface may further include a probe interface where measurement probes that can be coupled to the UUT at specific locations within the UUT circuitry (such as those test points shown in FIG. 2). As is known, such measurement probes can be used to provide signals to test equipment, such as the oscilloscope and the spectrum analyzer.

The system controller functional modules can be implemented, for example, in hardware (e.g., gate-level logic, such as FPGA or ASIC), software (e.g., executable instructions stored on processor readable memory, that when executed by a processor, cause the processor to carry out functionalities described herein including vulnerability assessment, firmware (e.g., routines embedded in microcontroller for carrying out functionalities described herein), or a combination thereof. Example vulnerability assessment tests will now be described.

Sensitivity Test. For this test, the signal generator SG-1 applies a simulated trigger waveform at increasing amplitude (e.g., from −140 dBm to 0 dBm, at 5 dBm increments) to the antenna of the UUT (via the antenna coupler of the UUT interface). At the same time, the spectrum analyzer monitors (via a probe of the UUT interface) for transmission from the UUT (e.g., at points I, H, J, or K of FIG. 2). When the UUT transmits in response to the trigger waveform, the amplitude being delivered via SG-1 to the RF input of the UUT (e.g., points A or B of FIG. 2) at that time is recorded. This test effectively indicates the sensitivity of the antenna to trigger signals. Recall that the points being probed are associated with the FM demodulator chip/circuit of the UUT, as discussed with reference to FIG. 2. The measurement results can be formatted into a table or otherwise suitable presentation by a reporting function programmed or otherwise configured into the system controller, and displayed (e.g., on LCD display of laptop on which the system controller is executing) to the user.

Power Sweeps. For this test, the signal generator SG-1 applies a continuous wave (CW) signal at the UUT receiver frequency (e.g., 229.16 MHz) at increasing amplitudes (e.g., from −140 dBm to 0 dBm, at 1 to 10 dBm increments) to the antenna of the UUT (via the antenna coupler of the UUT interface). At the same time, the oscilloscope (via a probe of the UUT interface) measures the responses at the input to the FM detector of the UUT (e.g., points E or F of FIG. 2) and the RF input of the UUT (e.g., points A or B of FIG. 2). Thus, this test indicates the target device's response to power level. The raw data results showing response data as a function of the changing amplitude can be displayed to the user via the CRT of the oscilloscope. If so desired, a reporting function of the system controller can receive the raw data (e.g., Vp-p response for each increment of amplitude in dBm) via the Ethernet hub, and process that data (e.g., normalize, format, color code traces and/or markers, convert to desired units such as from Vp-p to dBm, overlay relevant informational guides such as 1 dB compression point marker and corresponding data) and display the results (e.g., on LCD display of laptop on which the system controller is executing) to the user.

FM Demodulator Sweeps. For this test, the signal generator SG-1 applies a CW signal at a known amplitude (e.g., −55 dBm) across the UUT receiver frequency band (e.g., 229.135 MHz to 229.185 MHz) to the antenna of the UUT (via the antenna coupler). At the same time, the oscilloscope (via a probe) measures the responses at the input to the FM detector of the UUT (e.g., points E or F of FIG. 2) and the RF input of the UUT (e.g., points A or B of FIG. 2). Thus, this test indicates frequency response (e.g., passband, bandwidth, gain, etc) of the target device's receiver front-end, at one or more points. Such information can be used in developing interference signals/schemes that are effective for defeating malicious behavior involving use of the wireless communications device (e.g., such as remote triggering a detonator). The raw data results showing response data as a function of the changing frequency can be displayed to the user via the CRT of the oscilloscope. If so desired, a reporting function of the system controller can receive the raw data (e.g., Vp-p response for each increment of frequency in MHz) via the Ethernet hub, and process that data (e.g., normalize, format, color code traces and/or markers, convert to desired units such as from Vp-p to dBm, overlay relevant informational guides such as −3 dB/−6 dB/−9 dB bandwidth markers and corresponding bandwidth, etc) and display the results to the user (e.g., on LCD display of laptop on which the system controller is executing).

Tone Demodulator Sweep. For this test, the signal generator SG-1 injects an FM modulated signal at a known amplitude (e.g., at 90% non-linear amplitude) at the UUT receiver frequency band (e.g., 229.16 MHz) to the antenna of the UUT (via the antenna coupler of the UUT interface) and sweeps the FM tone frequency (e.g., from 3500 to 5000 Hz). At the same time, the oscilloscope (via a probe of the UUT interface) measures the responses at the input to the tone demodulator of the UUT (e.g., points G or H of FIG. 2). This test indicates frequency response (e.g., passband, bandwidth, gain, etc) of the target device's receiver tone decoder. Such information can be used in developing interference signals/schemes effective for defeating malicious behavior. The raw data results showing response data as a function of the changing input FM tone frequency can be displayed to the user via the CRT of the oscilloscope. If so desired, a reporting function of the system controller can receive the raw data (e.g., Vp-p response for each increment of tone frequency in MHz) via the Ethernet hub, and process that data (e.g., normalize, format, color code, convert to desired units such as from Vp-p to dBm, overlay relevant informational guides such as tone center and −1 dB bandwidth marker and corresponding bandwidth) and display the results to the user (e.g., on LCD display of laptop on which the system controller is executing).

Figure 6:
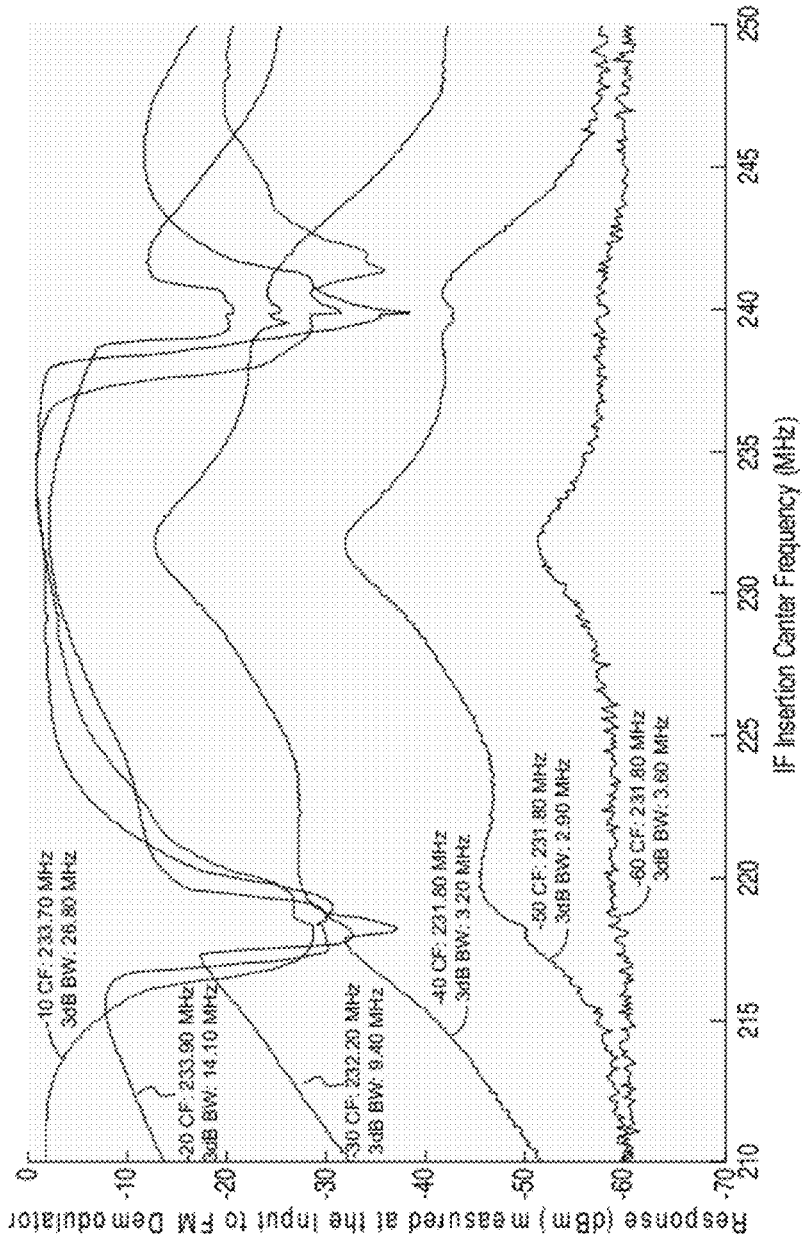
FIG. 6 illustrates example results for an IF insertion sweeps test, in accordance with one embodiment of the present invention.

IF Insertion Sweeps. For this test, two tones separated by the first IF of the UUT are injected via the antenna interface. For instance, signal generator SG-1 can apply the first CW signal, and signal generator SG-2 can apply the second CW. This IF injection is swept across the operational band of the UUT (e.g., 210 MHz to 250 MHz), which is determined by the receive frequency of the UUT. The sweeps are conducted at different input amplitudes (e.g., ranging from −70 dBm to 0 dBm). At the same time, the spectrum analyzer (via a probe) measures the responses at the RF input of the UUT (e.g., points A or B of FIG. 2). This test indicates the target device's in-band response to an IF signal of increasing power. This information, along with other information such as antenna characterization can be used determine the optimum injection point for an IF injection. In some cases, the receiver may be tuned over a large range of frequencies so IF injection may provide an advantage depending on how much energy the receiver antenna and front-end allow through compared to a spread waveform. The raw data results showing response data as a function of the changing IF insertion center frequency can be displayed to the user via the CRT of the analyzer. Again, a reporting function of the system controller can receive the raw data (e.g., response in dBm for each increment of IF insertion frequency in MHz) via the Ethernet hub, and process that data (e.g., color code the traces for each of the input amplitudes, and identify the IF insertion center frequency and 3 dB bandwidth for each trace) and display the results (e.g., on LCD display of laptop on which the system controller is executing) to the user. Note that such features may be configured directly into the spectrum analyzer set-up via the system controller, so that the analyzer's CRT display can be used (instead of the laptop CRT). FIG. 6 illustrates example results for an IF insertion sweeps test, in accordance with one embodiment of the present invention.

Figure 7B:
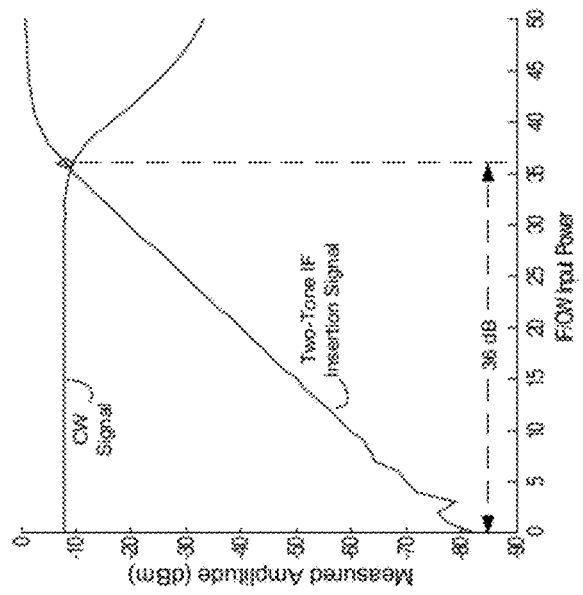
FIG. 7*a*-*b* illustrate example results for multi-signal injection tests, in accordance with one embodiment of the present invention.
Figure 7A:
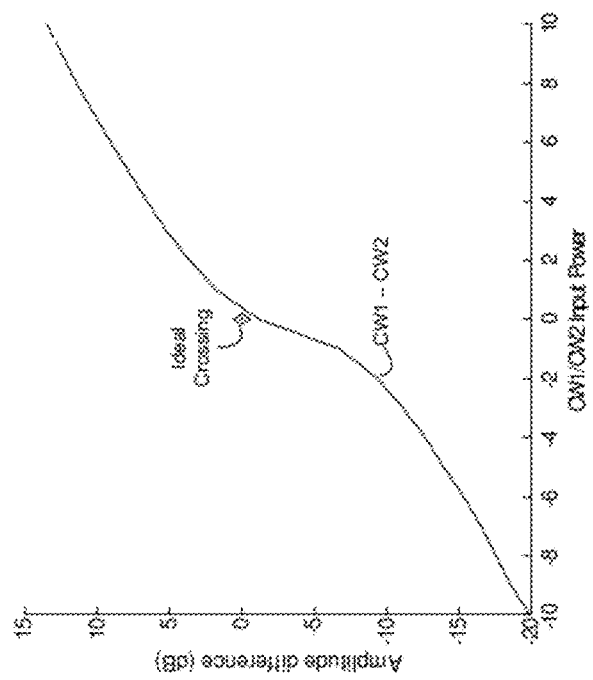

Multi-Signal Injection. This test actually includes two different but related tests, for each of which two signals or tones are injected within the passband of the UUT via the antenna interface. In one test, both tones are CW carriers, and in the second test one tone is a simple CW and the other is the product of two-tone IF insertion. Again, signal generators SG-1 and SG-2 can be commanded to provide these various tones. In both such tests, the amplitude of one injected signal is changed to determine the point at which both signals are the same amplitude (for the first test, and as shown in FIG. 7a), and at what rate the amplitude received at the RF input to the UUT (e.g., points A or B of FIG. 2) is changed in relation to the transmitted amplitude of the injected signals (for the second test, and as shown in FIG. 7b). In more detail, and with reference to the example first test shown in FIG. 7a, the spectrum analyzer is configured to display the difference between the two CW carrier signals (CW1-CW2) as the input power of one signal is varied from −10 dBm to +10 dBm. The input power associated with an amplitude difference of zero (i.e., when the two tones are the same amplitude) can be logged or otherwise identified. As can be seen, this zero difference point is designated in FIG. 7a as the ideal crossing. With reference to the example second test shown in FIG. 7b, with the amplitude of the CW signal set based on the ideal crossing of the first test, the amplitude of the two-tone IF insertion signal is increased (e.g., from 0 dBm to 50 dBm, at 1 dBm increments) until the ideal crossing is reached by the IF insertion signal and while simultaneously measuring the power at the RF input to the UUT (e.g., points A or B of FIG. 2), which in this example case ranges from −80 dBm to 0 dBm. For this particular target device, an IF insertion signal about 36 dB higher power than the CW signal inside the receiver bandwidth of the target radio can be used to interfere with that CW signal. Thus, for instance, if the standard CW signal is being used as a trigger signal in a malicious application of the UUT/target device, an IF insertion signal having the appropriate power level can be injected to prevent or otherwise impede delivery of that trigger signal.

Base Drift Test. This test can be carried out by monitoring the local oscillator of the target device/UUT receiver circuitry for frequency drift (e.g., from −800 Hz to +800 Hz), while transmitting from a cold start. As time from the cold start (e.g., Time equals 0 seconds) to some time thereafter (e.g., Time equals 2000 seconds), the temperature of the target device increases. The affect of this temperature increase on frequency drift can then be analyzed. In one such case, the receive local oscillator frequency is detected at the antenna interface (via the antenna coupler of the RF shield box), and can be measured and/or logged by the spectrum analyzer. Generally speaking, as the time from the cold start increases, the frequency drift of the receiver's local oscillator tapers off and becomes relatively stable. In some embodiments, a temperature chamber can be used to induce specific temperature states (e.g., to mimic a cold start-up or extended power on condition, environmental conditions, and/or emplaced devices proximate to the device that further affect device temperatures). As will be appreciated in light of this disclosure, understanding this drift profile can be used in disabling or otherwise impeding use of the UUT for malicious purposes. For example, any waveforms designed to counter performance of the target device can be tested over the drifted frequency range, to ensure effectiveness regardless of state of operation and other pertinent variables (e.g., whether device state is at cold start or after extended period of power-up, environmental conditions based on relevant climate where target device is deployed, and/or proximity of target device to other heat producing elements).

Handset Drift Test. For this particular test, the handset (usually the trigger signal) is placed in an RF shield box on a DC power supply. The DC power supply can be, for example, a battery that is typically used in malicious applications involving wireless communication devices (e.g., such as a battery or other power source used for powering detonator circuitry). In short, the DC power supply provides a general heat profile that, when activated, may further impact temperature related drift of the UUT. Any number of typical power supplies can be used here. Once the UUT and DC power supply are activated, both the transmit local oscillator frequency and the receive local oscillator frequency of the target device are monitored (via the antenna interface of the RF shield box) for frequency drift while transmitting from a cold start. As previously explained with reference to the Base Drift Test, understanding such drift profiles can be used in disabling or otherwise impeding use of the UUT for malicious purposes.

Figures 8A, 8B:
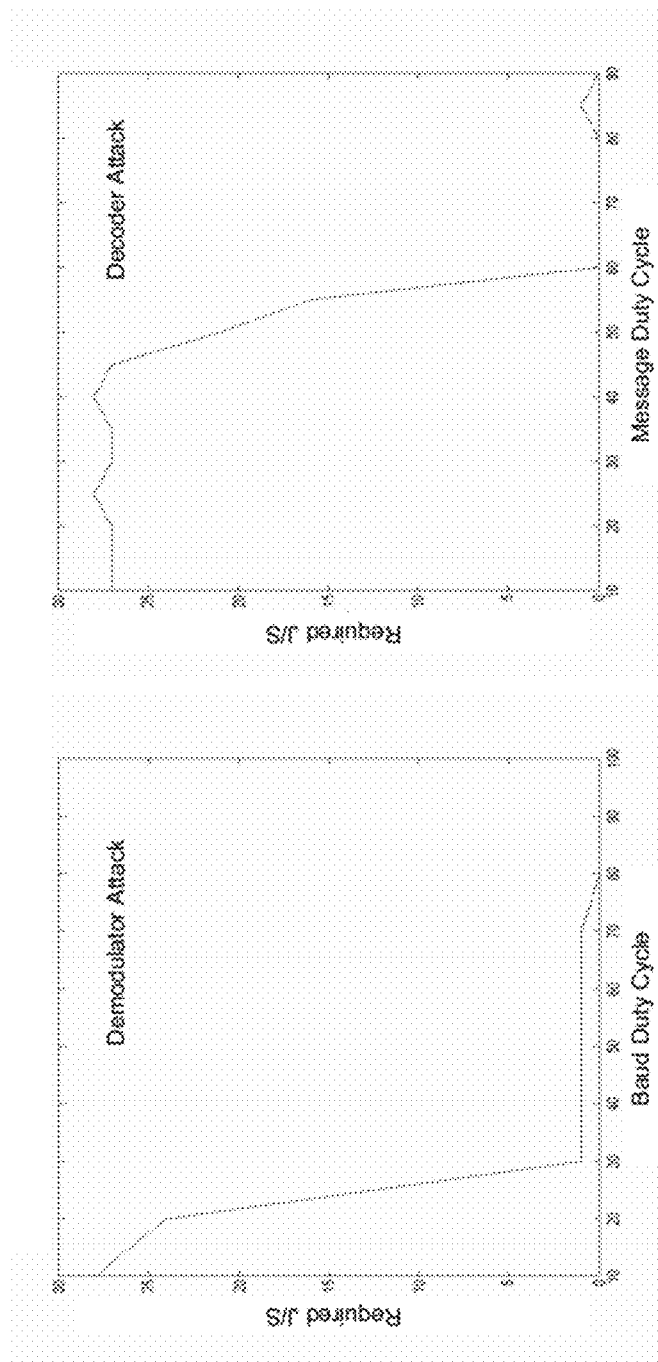
FIG. 8*a* illustrates the jamming to signal ration (J/S) vs. baud length duty cycle percentage in the context of a demodulator attack, in accordance with one embodiment of the present invention.
FIG. 8*b* illustrates the J/S vs. the message length duty cycle percentage not synchronized to frame, in the context of a decoder attack, in accordance with one embodiment of the present invention.

CW Denial. For this test, the signal generator SG-1 is used to provide the trigger signal and SG-2 is used to inject a jamming waveform, both of which are applied to the antenna of the UUT (via the antenna coupler of the UUT interface). The trigger signal is essentially the signaling used to create a response in the target receiver (e.g., a ring, break squelch, audio tone etc), and includes the correct RF frequency and the appropriate modulation and protocol (if applicable) to recreate the appropriate response. In one embodiment, the jamming waveform is a CW signal at the UUT receiver frequency (e.g., 229.16 MHz). The duty cycle of the jamming waveform is reduced (e.g., 10% decrements, from 10 to 80%), so as to determine the required jamming to signal (J/S) ratio. In particular, the spectrum analyzer (via a probe of the UUT interface) measures the response to the trigger signal at the input to the received at the RF input to the UUT (e.g., points A or B of FIG. 2). The absence of an RF response to the trigger signal generally indicates a successful interference/jam to signal ratio. FIG. 8a depicts the J/S vs. baud length duty cycle percentage (which is about 26 ms, in this example), in the context of a demodulator attack. FIG. 8b depicts the J/S vs. the message length duty cycle percentage (which is about 26 ms*45 bauds, in this example) not synchronized to frame, in the context of a decoder attack.

Matched Waveform Denial. This test is similar in concept to the previously described CW Denial test, except that SG-2 provides an FM modulated signal transmitted at the UUT receiver frequency which is used as the jamming waveform, and the required J/S ratio is determined. This interfering signal can effectively be configured to match the trigger signal. Other than this difference, the previous discussion with reference to the CW Denial test is equally applicable here.

Chirp Denial. This test is similar in concept to the previously described CW Denial test, except that SG-2 provides chirps ranging in chirp time (e.g., from 20 us to 500 us) which are used as a jamming waveform while the trigger waveform is stepped in power (e.g., from −45 to −21 dBm). The jam waveform is decreased in power (e.g., from 0 to −40 dBm) until the trigger waveform is able to stimulate the UUT. The J/S for each chirp and UUT power level is recorded by the spectrum analyzer (e.g., via a probe at the RF input to the UUT, such as points A or B of FIG. 2). Other than this difference, the previous discussion with reference to the CW Denial test is equally applicable here.

Swept Chirp Denial. This test is similar in concept to the previously described CW Denial test, except that SG-2 provides chirps ranging in frequency (e.g., 15, 12, 4, and 2 KHz, stepped in 250 Hz increments across 15 KHz, at −27 dBm) which are used as a jamming waveform. The J/S for each chirp and UUT power level is recorded by the spectrum analyzer (e.g., via a probe at the RF input to the UUT, such as points A or B of FIG. 2). Other than this difference, the previous discussion with reference to the CW Denial test is equally applicable here. In this particular case, note that the difference in J/S required relative to the amount by which the jamming frequency is off (relative to frequency of the trigger signal) can also be determined.

Figure 9B:
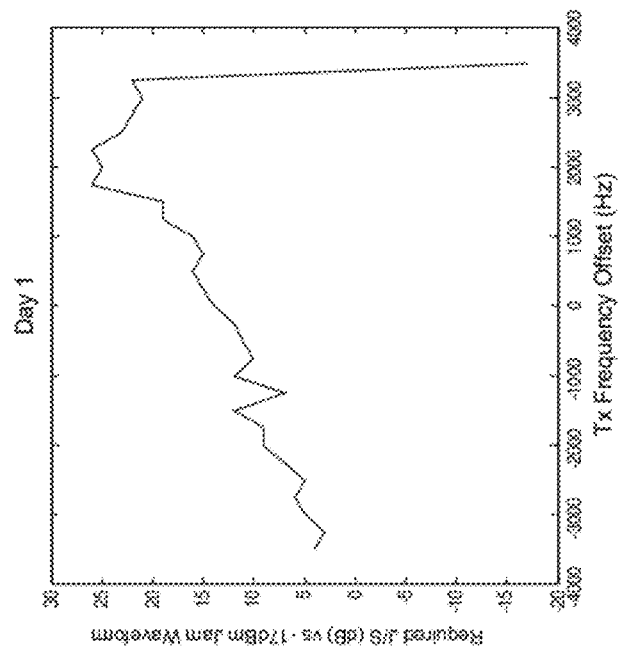
Figure 9A:
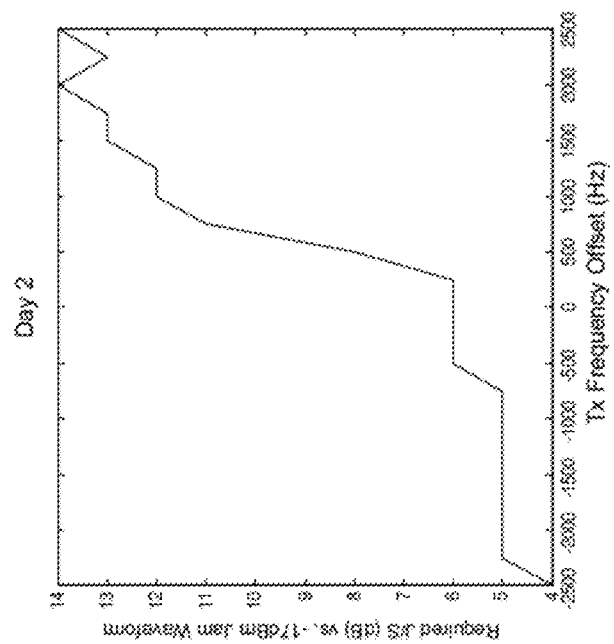

Swept Trigger. This test is similar in concept to the previously described CW Denial test and is designed to work with some of the drift test measurement results. In particular, the trigger signal frequency provided by SG-1 is changed over the drift range while an interference signal provided by SG-2 (in this case, a chirp) is increased in amplitude in order to determine what effect the relationship between trigger frequency and interference has on J/S. In one example case, the trigger signal provided by SG-1 is swept across a 5 KHz bandwidth centered around the receive RF frequency, and the interference signal provided by SG-2 is a chirp having a start frequency and an end frequency and sweeps between the two frequencies in a specific period (e.g., the start frequency is lower). The starting amplitude of the chirp is dependent on the bandwidth of the chirp. In order for a chirp to deliver equal amplitude in a target receiver, it requires 10*log 10(sweep_bw/rcvr_bw) more dB, where sweep_bw is the sweep bandwidth and rcvr_bw is the receiver bandwidth. For example, if chirping a bandwidth of 1 MHz and the receiver has a bandwidth of 15 KHz, then the chirp would require about 18.3 dB more power. In one such case, the chirp amplitude starts at about 15 dB less amplitude delivered into the receiver and increases to about +15 dB delivered. FIGS. 9a and 9b illustrate the different waveforms on the same target for such an example Swept Trigger test, wherein FIG. 9a shows the waveform from Day 1 and FIG. 9b shows the waveform on Day 2 (assume 24 hours allowed for drift).

Note that in a general sense, the swept trigger and swept chirp tests are designed to analyze various chirp periods and duty cycle (which effect where spectral lines are created) in relation to the receiver passband. Further note that running a single test of a chirp or any waveform may give misleading results due to transmit and receive drift. Thus, any given test can be run on different days and yield different results to explore drift (one test can be run on a "cold" device, while the next test can be run after a period during which the device was powered on). Moreover, some initial calibration steps may be incorporated into the vulnerability assessment process, to account for drift or other variables that impact device performance. For instance, in some embodiments, a preliminary test is executed that checks the center of the device's receiver passband before beginning any of the previously discussed vulnerability assessment tests. If the measured passband center is different from the expected passband center (i.e., the passband center upon which the test was designed), then that difference can be used to offset any interference waveforms or test signals provided.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for analyzing a wireless communications device, the method comprising:
    automatically assessing vulnerability of the wireless communications device, including its susceptibility to jamming, by applying one or more interfering signals to the wireless communications device and observing a response from the wireless communications device, wherein automatically assessing vulnerability includes accessing the wireless communications device by both an antenna interface of the device and a probe interface connected to one or more test points within the device; and automatically identifying one or more vulnerabilities that can be exploited in defeating malicious behavior involving use of the wireless communications device, wherein the malicious behavior involves using the wireless communications device for remote detonation of explosives;

wherein applying the one or more interfering signals includes:

applying a trigger signal associated with the malicious behavior and a jamming signal to the wireless communications device; and adjusting the jamming signal until the trigger signal is rendered ineffective in acting as a trigger signal; and wherein identifying the one or more vulnerabilities includes:

reporting parameters of the jamming signal that result in defeating the malicious behavior.

2. The method of claim 1 wherein the one or more vulnerabilities of the wireless communications device include at least one of radio access vulnerabilities, FM demodulator vulnerabilities, signaling layer processing vulnerabilities, DTMF decoder vulnerabilities, telemetry decoder vulnerabilities, message recovery vulnerabilities, and protocol processing vulnerabilities.

3. The method of claim 1 wherein applying the trigger signal includes adjusting the trigger signal by modifying at least one of power and frequency of the trigger signal.

4. The method of claim 1 further comprising characterizing the wireless communications device to identify one or more performance attributes of the wireless communications device that can be used in assessing vulnerability.

5. The method of claim 4 wherein characterizing the wireless communications device to identify one or more performance attributes of the device comprises at least one of:

measuring at least one of transmit power, receiver sensitivity, and antenna performance of the wireless communications device;

measuring at least one of filter performance, amplifier gain, mixer performance, channelization, and frequency/time division performance of the wireless communications device; and measuring baseband processing and decoder performance and response time of the wireless communications device.

6. The method of claim 4 wherein characterizing the wireless communications device to identify one or more performance attributes of the device comprises at least one of:

analyzing modulation and/or demodulation parameters of the wireless communications device; and analyzing protocol parameters of the wireless communications device.

7. The method of claim 4 wherein characterizing the wireless communications device to identify one or more performance attributes of the device comprises at least one of:

conducting passive unintentional radiation exploitation (URE) sweeps and active URE sweeps in passband of the wireless communications device;

conducting two-tone sweeps and direct transmission on intermediate frequencies of the wireless communications device, and on frequencies that generate the intermediate frequency as a harmonic; and identifying unique signature characteristics of the wireless communications device.

8. The method of claim 1 further comprising target deployment and operation assessment to define how of the target communications device can be deployed and triggered in the context of the malicious behavior.

9. The method of claim 1 wherein adjusting the jamming signal until the trigger signal is rendered ineffective in acting as a trigger signal includes modifying at least one of power, frequency, and duty cycle of the jamming signal.

10. The method of claim 1 wherein the one or more vulnerabilities of the wireless communications device include at least one of FM demodulator vulnerabilities, signaling layer processing vulnerabilities, DTMF decoder vulnerabilities, and telemetry decoder vulnerabilities.

11. A computer-readable memory having instructions encoded thereon that when executed by a processor, cause a process for analyzing a wireless communications device to be carried out on a test system, the process comprising:

automatically assessing vulnerability of the wireless communications device, including its susceptibility to jamming, by applying one or more interfering signals to the wireless communications device and observing a response from the wireless communications device, wherein automatically assessing vulnerability includes accessing the wireless communications device by both an antenna interface of the device and a probe interface connected to one or more test points within the device; and automatically identifying one or more vulnerabilities that can be exploited in defeating malicious behavior involving use of the wireless communications device, wherein the malicious behavior involves using the wireless communications device for remote detonation of explosives;

wherein applying the one or more interfering signals includes:

applying a trigger signal associated with the malicious behavior and a jamming signal to the wireless communications device; and adjusting the jamming signal until the trigger signal is rendered ineffective in acting as a trigger signal; and wherein identifying the one or more vulnerabilities includes:

reporting parameters of the jamming signal that result in defeating the malicious behavior.

12. The computer-readable memory of claim 11 wherein the one or more vulnerabilities of the wireless communications device include at least one of radio access vulnerabilities, FM demodulator vulnerabilities, signaling layer processing vulnerabilities, DTMF decoder vulnerabilities, telemetry decoder vulnerabilities, message recovery vulnerabilities, and protocol processing vulnerabilities.

13. The computer-readable memory of claim 11 wherein applying the trigger signal includes adjusting the trigger signal by modifying at least one of power and frequency of the trigger signal.

14. The computer-readable memory of claim 11 further comprising characterizing the wireless communications device to identify one or more performance attributes of the wireless communications device that can be used in assessing vulnerability, including at least one of:

measuring at least one of transmit power, receiver sensitivity, and antenna performance of the wireless communications device;

measuring at least one of filter performance, amplifier gain, mixer performance, channelization, and frequency/time division performance of the wireless communications device;

measuring baseband processing and decoder performance and response time of the wireless communications device;

analyzing modulation and/or demodulation parameters of the wireless communications device;

analyzing protocol parameters of the wireless communications device;

conducting passive unintentional radiation exploitation (URE) sweeps and active URE sweeps in passband of the wireless communications device;

conducting two-tone sweeps and direct transmission on intermediate frequencies of the wireless communications device, and on frequencies that generate the intermediate frequency as a harmonic; and identifying unique signature characteristics of the wireless communications device.

15. The computer-readable memory of claim 11 further comprising target deployment and operation assessment to define how of the target communications device can be deployed and triggered in the context of the malicious behavior.

16. The computer-readable memory of claim 11, wherein adjusting the jamming signal until the trigger signal is rendered ineffective in acting as a trigger signal includes modifying at least one of power, frequency, and duty cycle of the jamming signal.

17. The computer-readable memory of claim 11 wherein the one or more vulnerabilities of the wireless communications device include at least one of FM demodulator vulnerabilities, signaling layer processing vulnerabilities, DTMF decoder vulnerabilities, and telemetry decoder vulnerabilities.

18. A system for analyzing a wireless communications device, comprising:

a vulnerability assessment module for automatically assessing vulnerability of the wireless communications device, including its susceptibility to jamming, by applying one or more interfering signals to the wireless communications device and observing a response from the wireless communications device, wherein automatically assessing vulnerability includes accessing the wireless communications device by both an antenna interface of the device and a probe interface connected to one or more test points within the device; and a reporting module for identifying one or more vulnerabilities that can be exploited in defeating malicious behavior involving use of the wireless communications device, wherein the malicious behavior involves using the wireless communications device for remote detonation of explosives;

wherein in applying the one or more interfering signals, the vulnerability assessment module is configured to apply a trigger signal associated with the malicious behavior and a jamming signal to the wireless communications device, and to adjust the jamming signal until the trigger signal is rendered ineffective in acting as a trigger signal; and wherein in identifying the one or more vulnerabilities, the reporting module is configured to report parameters of the jamming signal that result in defeating the malicious behavior.

19. The system of claim 18 wherein the vulnerability assessment module is further configured to adjust the trigger signal by modifying at least one of power and frequency of the trigger signal.

20. The system of claim 18 wherein in adjusting the jamming signal until the trigger signal is rendered ineffective in acting as a trigger signal, the vulnerability assessment module is further configured to modify at least one of power, frequency, and duty cycle of the jamming signal.

* * * * *